United States Patent [19]

Fujii

[11] 4,231,451
[45] Nov. 4, 1980

[54] BRAKE HOLDER WITH PROTUBERANCES FOR HOLDING A SHOE BODY IN PLACE

[75] Inventor: Yuji Fujii, Sakai, Japan

[73] Assignee: Shimano Industrial Company, Limited, Osaka, Japan

[21] Appl. No.: 931,004

[22] Filed: Aug. 4, 1978

[30] Foreign Application Priority Data

Aug. 11, 1977 [JP] Japan .................. 52-108464[U]

[51] Int. Cl.³ .............................................. F16D 69/04
[52] U.S. Cl. .................................... 188/73.1; 188/244
[58] Field of Search ....................... 188/24, 71.1, 73.1, 188/250 G, 234, 245, 244

[56] References Cited

U.S. PATENT DOCUMENTS 1,781,074  11/1930  Norton .................. 188/250 G

FOREIGN PATENT DOCUMENTS

| 579602 | 8/1924 | France | 188/24 |
| 768359 | 5/1934 | France | 188/24 |
| 924344 | 3/1947 | France | 188/24 |
| 982884 | 1/1951 | France | 188/24 |
| 989889 | 5/1951 | France | 188/24 |

Primary Examiner—George E. A. Halvosa
Attorney, Agent, or Firm—Stevens, Davis, Miller & Mosher

[57] ABSTRACT

An improved brake block shoe holder has a bottom, a pair of side walls, a front wall, but no rear wall, and on at least one of the opposite side walls a plurality of protuberances directed toward the front wall. The protuberances cut into a brake block pressed into the holder from the rear side thereof and prevent it from dropping out while permitting its easy replacement when worn.

3 Claims, 11 Drawing Figures

BRAKE HOLDER WITH PROTUBERANCES FOR HOLDING A SHOE BODY IN PLACE

BACKGROUND AND SUMMARY OF THE INVENTION

This invention relates to a brake shoe used for a bicycle brake and the like, and more particularly to a brake shoe used mainly in calliper brakes.

Generally, a brake shoe, such as used in calliper brakes, comprises a main body or brake block of a rectangular prism-like shape made of friction material and a holder carrying the brake block and having mounting means for mounting the brake shoe to a brake arm of the calliper brake. The holder comprises a rectangular bottom, a front wall rising upright at the front end lengthwise of the bottom, and a pair of side walls rising from both lateral sides of the bottom, but a rear wall is omitted, thus forming a box-like shape opening upwardly and rearwardly. The brake block is pressed into the holder from the rear side thereof toward the front wall, whereby the front wall and pair of side walls embrace and hold the brake block.

When this brake shoe is used in a calliper brake, the front wall of the holder mounted to the brake arm is placed ahead of the forward rotation of the bicycle wheel. As a result, when braking is applied to the forwardly rotating wheel, the brake block, which is subjected to the frictional force caused between the wheel rim and the same, tends to move forward, but the front wall arrests this movement to retain the brake block within the holder. On the other hand, when braking is applied to the wheel as it rotates backwardly, which may occur, for example, when braking is applied to the bicycle on an upward slope, the backwardly rotating wheel tries to move the brake block rearwardly of the holder, causing the brake block to gradually shift and drop out through the open rear side, resulting in no braking being applied to the bicycle.

In order to solve this problem, a holder has been proposed which has a front and rear wall, whereby the brake block is embraced by the side walls and both front and rear walls. To form a brake shoe with this holder, the brake block is first inserted into the surrounding walls at four sides of the holder and then the holder walls are bent inwardly to press the block. With this construction, it is impossible to remove only the brake block for replacement. In other words, although the provision of the rear wall prevents the drop-out of brake block, another problem occurs when replacement of the brake block is needed or desired. For this reason, conventional brake shoes usually use a holder having no rear wall to facilitate insertion and removal of the brake block only.

This invention has been designed to overcome the problem of a brake block dropping out of an associated holder while permitting its easy replacement. Accordingly, an object of the invention is to provide a brake shoe having a brake block which is easy pressed into a holder and retained therein against accidental drop-out, but which is easily replaced when worn.

This object is achieved by providing a holder having no rear wall with protuberances on at least one of the opposite side walls which are directed toward the front wall. The protuberances cut into the brake block pressed into the holder from the rear side thereof so that the brake block is prevented from dropping out and permits an easy replacement of the brake block. When the brake block is replaced, the worn block is broken for removal and a new block is pressed into the holder through the open rear side. A press plate may be provided along one of the side walls to press or release the brake block, thereby facilitating its insertion and removal.

These and other objects and novel features of the invention will be more apparent from the following description taken in conjunction with the accompanying drawings.

DETAILED DESCRIPTION OF THE INVENTION

Figure 1:
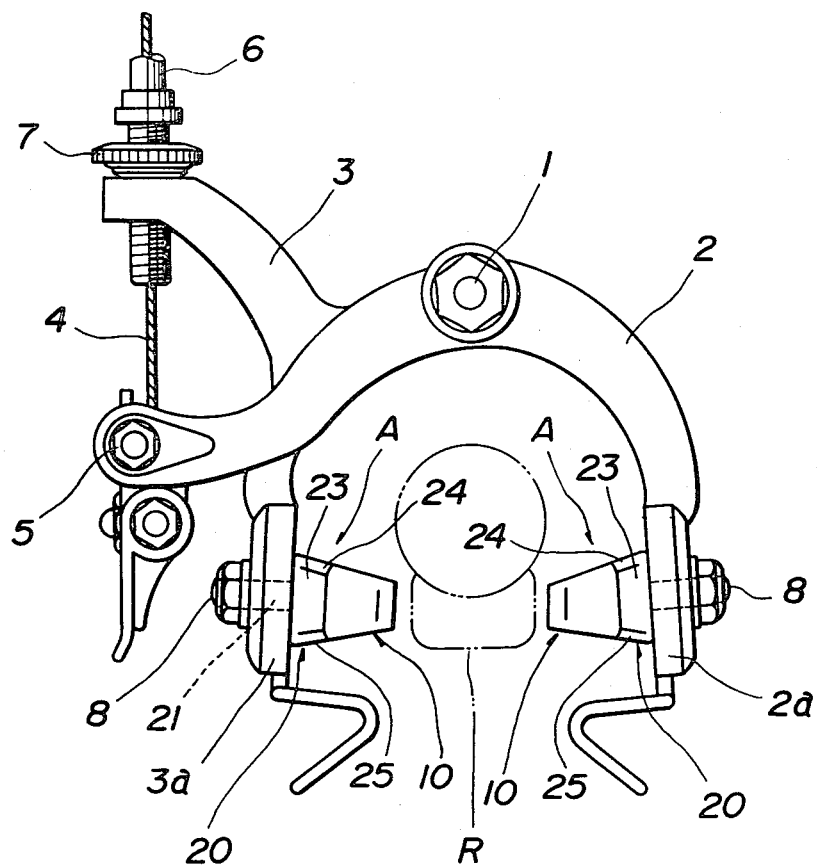
FIG. 1 is a front view of the calliper brake using the brake shoe of the invention.
Figure 2:
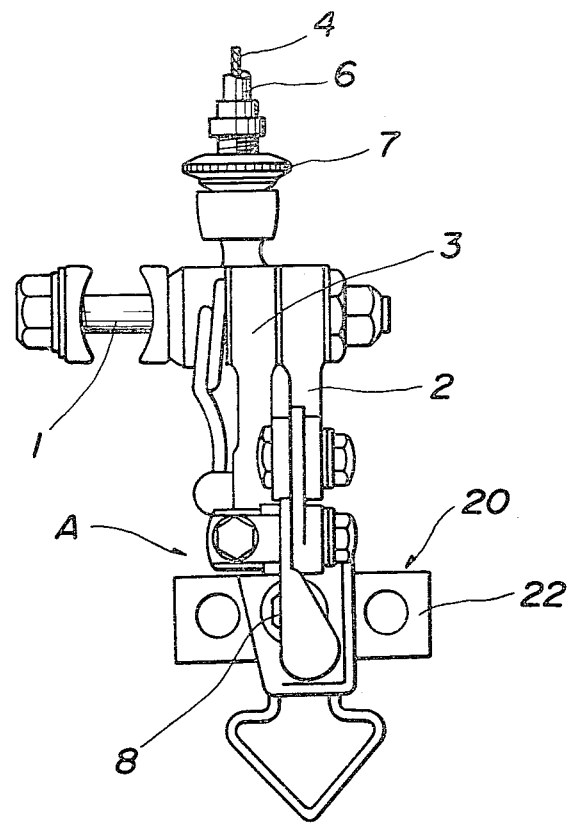
FIG. 2 is a side view of FIG. 1.

Referring to FIGS. 1 and 2, a well known calliper brake is shown. This brake is provided with a C-like shaped arm 2 and a Y-like shaped arm 3, which are swingably supported through a pivot 1. The arms 2 and 3 are provided at the foremost ends thereof with respective mounting seats 2a and 3a, to which the brake shoes A of the invention are attached. A control wire 4 from a lever (not shown) is terminated at one of the C-like shaped arm 2 via a retainer 5, and the Y-like shaped arm 3 carries through a stop 7 one end of an outer sheath guiding wire 4. A wheel rim R is shown by broken lines in FIG. 1.

Figure 3:
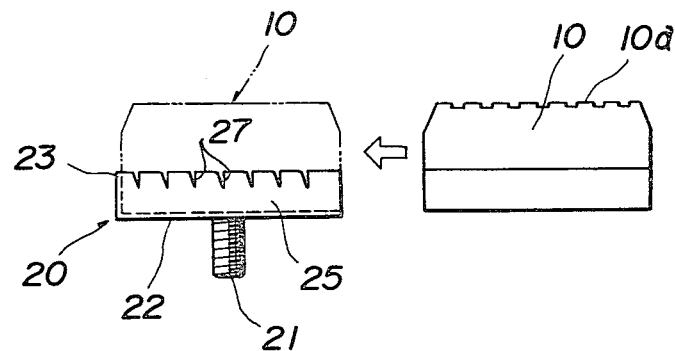
FIG. 3 is an exploded side view of an embodiment of the brake shoe of the invention.

The brake shoe of the invention is used in conjunction with the above-described calliper brake or the like, and comprises a shoe body 10 or brake block, of a substantially rectangular prism-like shape and a metallic holder 20 carrying the shoe body 10. Mounting means 21, such as screw bolts, which cooperate with nuts 8 to mount the shoe body 10 to each of the seats 2a and 3a, are also provided projecting from the rear side of holder 20. The body 10 is, as shown in the drawings, slightly tapered at both lateral sides toward the top thereof to form a substantially rectangular prism-like shape. At the uppermost surface of the body 10 are provided a plurality of lugs 10a (FIG. 3). The holder 20 is provided with a rectangular bottom 22, a front wall 23 rising upright from the lengthwise fore end of the bottom 22, and a pair of opposite side walls 24 and 25 respectively rising from the lateral sides of the bottom 22 in a slightly inwardly slanting direction. There is no rear wall opposite to the front wall 23 so the holder 20 has a box-like shape opening upwardly and rearwardly. The mounting means 21 comprising the screw bolt is provided at the bottom 22 of the holder 20.

Figure 4:
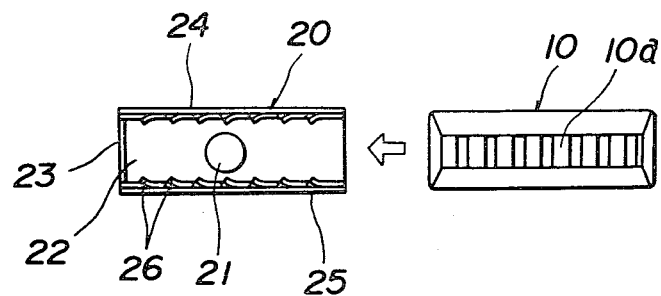
FIG. 4 is a plan view of the brake shoe embodiment shown in FIG. 3.
Figure 5:
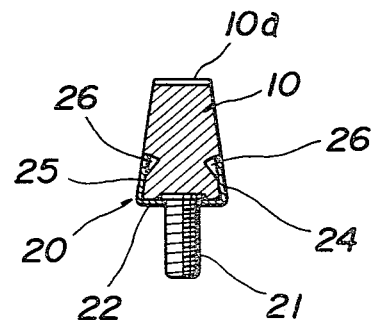
FIG. 5 is a sectional view of the brake shoe embodiment shown in FIG. 3.

The brake shoe A shown in FIGS. 3 through 5 has the side walls 24 and 25 provided with a plurality of protuberances 26 directed toward the front wall 23, and has a cavity surrounded by the bottom 22, front wall 23 and side walls 24 and 25, whereby the shoe body 10 is inserted into the cavity through the open rear side of the holder 20 and pressed by the side walls, thus being fixed to the holder 20 through the protuberances 26 biting into both lateral sides of the body 10.

The protuberances 26 may be provided at only one of side walls 24 and 25 instead of both walls. The protuberances 26, in addition to projecting inwardly of the housing 20, are preferable formed by a plurality of cutouts 27 created at the upper edges of the side walls 24 and 25 with each cutout forming a protuberance having a free edge directed toward an opposite side wall as shown in FIG. 3 and the side walls 24 and 25 are respectively partially bent inwardly from the bottoms of cutouts 27. It is further preferable to slant the bent portions with respect to the front wall 23, thereby forming substantially triangular protuberances 26.

The protuberances 26, formed as described above, are made sharp at their tips so they may reliably cut into the both lateral sides of the body 10 to prevent the shoe body 10 from dropping out of the holder 20.

The protuberances 26 being directed toward the front wall 23 of the holder 20 facilitate the insertion of shoe body 10 therein. During insertion, the elastic body 10 deforms and the protuberances 26 deflect as the body is seated in the holder 20. After being pressed into the holder 20, the shoe body is tightly secured thereto because the sharp tips of protuberances 26, directed against any force exerted on the body toward the open rear side of the holder, cut into the body 10 and hold it firmly in place.

To remove a worn shoe body 10 from holder 20, one need simply to break or cut body 10 without damage to the holder 10. Thereafter, a new shoe body is easily inserted into the holder 20 in the manner described above.

Figure 6:
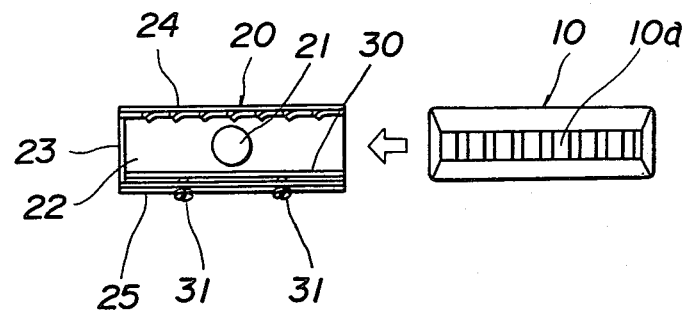
FIG. 6 is an exploded front view of a modified embodiment of the invention.
Figure 7:
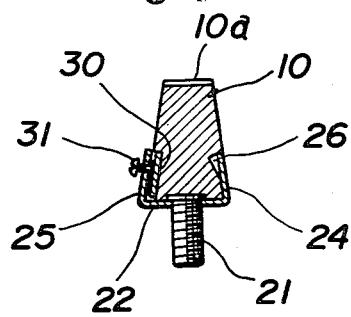
FIG. 7 is a sectional view of the modified embodiment shown in FIG. 6.

As an alternative to breaking or cutting the worn shoe body 10 to remove it from holder 20, one may use a press plate 30 as shown in FIGS. 6 and 7 on holder 20 which further facilitates removal and insertion of shoe body 10. In this variant, one side wall 24 of the holder is provided with a plurality of protuberances 26, and the press plate 30 is provided along the inner surface of the other side wall 25. An urging means 31, such as screw bolts, are provided on the holder to adjust the position of the press plate 30 and thus the force exerted on the shoe body 10.

In this embodiment, both the side walls 24 and 25 are spaced by an amount larger than the width of the shoe body 10. The shoe body 10 is inserted between the press plate 30 and the side wall 24, and then the urging means 31 are screwably tightened to press the plate 30 on the body 10 and against the protuberances 26 which fully cut into the body. On the other hand, the urging means 31 are unscrewed to release the body 10 and permit its removal from the holder 20. Another advantage of this embodiment is that shoe bodies of different sizes may be used with the same holder.

Figure 8:
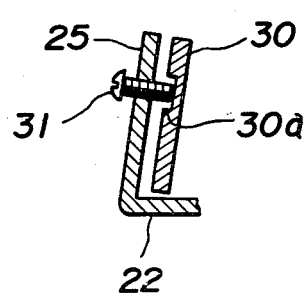
FIG. 8 is a partially enlarged sectional view of the principal portion of the FIG. 7 view.
Figure 9:
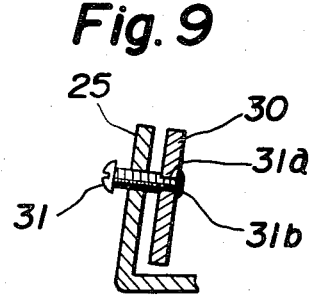
FIG. 9 is a partially enlarged sectional view of a variation in the embodiment shown in FIG. 7.

When screws are used as the urging means 31, it is enough to contact the tips of screws only with the press plate 30; however, as shown in FIG. 8, recesses 30a may be formed at the press plate 30 for receiving therein the tips of screws thereby enabling the press plate 30 to be set in position while being reliably retained from fall-off. As a further variant, the tips of screws 31, as shown in FIG. 9, may be reduced in diameter, to perforate through the press plate 30, and be retained thereto by, for example, snap ring 31b. With this construction, press plate 30 is made substantially axially immovable with respect to screws 31 while being axially movable with respect to the side wall 25 upon rotation of screws 31. This allows holder 20 to positively carry the press plate 30 so it will not be lost.

Figure 10:
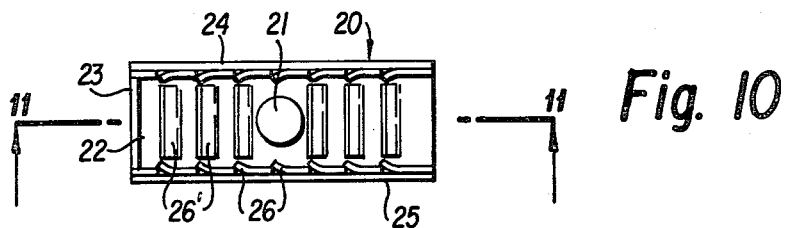
FIG. 10 is a plan view of another modified embodiment of the invention, and, FIG. 11 is a sectional side view of the FIG. 10 embodiment.
Figure 11:
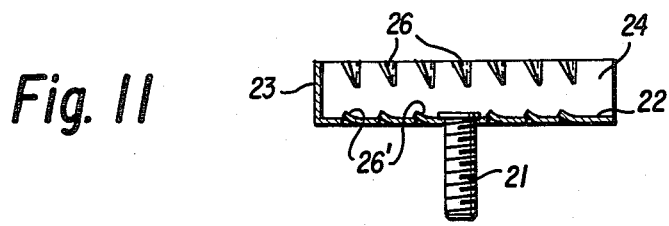

The protuberances 26 may, in addition to being provided at one or both side walls 24 and 25, be provided at the bottom 22 of the holder 20, as shown in FIGS. 10 and 11 at 26', in which case the surface of bottom 22 facing the shoe body 10 is intermittently swollen or V-like cut and bent so as to form the protuberances.

As described above, the brake shoe of the invention has protuberances provided on at least one of opposite side walls and optionally on the bottom of a shoe body holder, which are directed toward the holder front wall to facilitate pressing the shoe body into the holder without hinderance. After insertion, the protuberances cut into the lateral or under side of the shoe body, thereby immovably securing it to the holder. This construction assures that an accidental drop-out of the shoe body will not occur while permitting the easy replacement of a worn shoe body. The protuberances provided at the side wall are also effective in preventing the shoe body from loosening from the holder bottom and moving toward the wheel rim. The protuberances formed by cutting-out the side wall are also easily shaped into sharp tips, which considerably improves the prevention of drop-out of the shoe body.

While various embodiments of the invention have been shown and described, they are to be considered as merely exemplary and not limiting of the invention since various modifications can be made thereto without departing from the spirit and scope of the invention. Accordingly, the invention is limited solely by the appended claims.

What is claimed is:

1. A brake shoe used in a brake comprising:
a shoe body of a rectangular prism-like shape made of friction material; and
a holder carrying said shoe body and having mounting means for mounting said brake shoe to the brake, said holder comprising a bottom wall, a front wall and a pair of opposite side walls for gripping said brake shoe, said front and side walls being fixed to and rising from said bottom wall, each of said side walls including a first plurality of sharp cutting protuberances directed toward said front wall, said first plurality of protuberances being formed by said side walls being cut at the upwardly outer edge thereof to form cutouts, each cutout forming a protuberance having a free edge directed toward an opposite side wall, said side walls being partially bent inwardly at said cutouts toward said shoe from the bottoms thereof respectively, whereby said free edges of said first plurality of protuberances cut into said shoe body carried by said holder.

2. The brake shoe according to claim 1, wherein each of said cutouts extends in the same direction as the rise of said side walls and said bent portions are slant from the bottoms of said cutouts with respect to said front wall respectively, whereby said first plurality of protuberances are made substantially triangular.

3. The brake shoe according to claim 1, further comprising a second plurality of protuberances provided at said bottom wall, said second plurality of protuberances being directed toward said front wall.

* * * * *